United States Patent
Lapeyre et al.

(10) Patent No.: US 6,802,412 B2
(45) Date of Patent: Oct. 12, 2004

(54) CONVEYOR WITH A MOTORIZED TRANSPORT ELEMENT

(75) Inventors: Robert S. Lapeyre, New Orleans, LA (US); Christopher G. Greve, Covington, LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 10/065,785

(22) Filed: Nov. 19, 2002

(65) Prior Publication Data

US 2004/0094387 A1 May 20, 2004

(51) Int. Cl.[7] .............................................. B65G 47/34
(52) U.S. Cl. .................. 198/370.02; 198/890
(58) Field of Search ..................... 198/890, 890.1, 198/370.02, 370.03

(56) References Cited

U.S. PATENT DOCUMENTS

| | | | |
|---|---|---|---|
| 4,732,260 A | 3/1988 | Canziani | 198/365 |
| 5,127,510 A | 7/1992 | Cotter et al. | 198/372 |
| 5,165,515 A | 11/1992 | Nitschke et al. | 198/349.95 |
| 5,275,273 A | 1/1994 | Veit et al. | 198/370 |
| 5,890,584 A | 4/1999 | Bonnet | 198/867.15 |
| 5,909,797 A | 6/1999 | Van Den Goor | 198/370.02 |
| 5,921,378 A | 7/1999 | Bonnet | 198/850 |
| 5,950,798 A * | 9/1999 | Bonnet | 198/370.02 |
| 6,041,909 A | 3/2000 | Shearer, Jr. | 198/370.02 |
| 6,044,956 A | 4/2000 | Henson et al. | 198/370.02 |
| 6,318,539 B1 * | 11/2001 | Bonnet | 198/370.02 |
| 6,478,144 B1 | 11/2002 | Sweazy | 198/890 |

* cited by examiner

*Primary Examiner*—Christopher P. Ellis
*Assistant Examiner*—Mark A. Deuble
(74) *Attorney, Agent, or Firm*—James T. Cronvich

(57) ABSTRACT

A conveying system including individually motorized transport elements or shoes that transport articles laterally across a conveyor. The motorized transport elements ride along tracks across the width of the conveyor. A motor drives each transport element across the conveyor. Local controllers in the transport elements or in the conveyor control the application of power to the motors and, thereby, the lateral positioning of the transport elements and the conveyed articles.

50 Claims, 15 Drawing Sheets

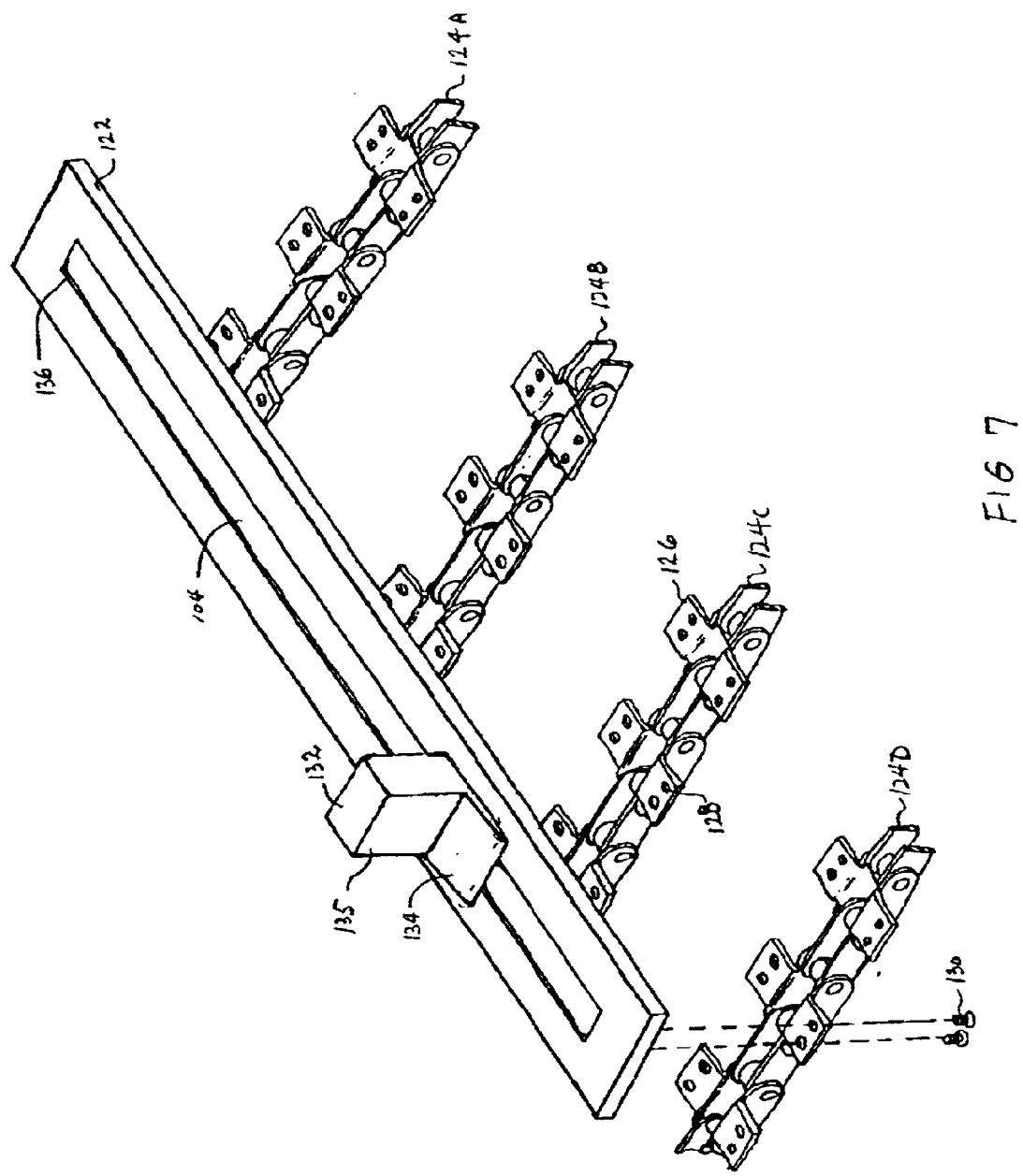

CONVEYOR WITH A MOTORIZED TRANSPORT ELEMENT

BACKGROUND OF INVENTION

The invention relates generally to the conveying and diverting of articles and, more particularly, to a conveyor having individually motorized transport elements to transport conveyed articles across the conveyor.

Typical sorting or article-diverting conveyor systems include a conveyor, such as an endless conveyor belt or a slat chain, having shoes for pushing articles across the conveyor. Typically the shoe has an appendage that terminates in a cam follower, such as a roller or a keel. The cam followers ride in a guide track arrangement in the conveyor frame beneath the conveyor. As the conveyor moves, the guide track arrangement directs the cam followers and the associated shoes across the conveyor. In this way, the shoes are programmed by the guide track arrangement to transport product to specific lateral positions at specific points along the conveying path.

But such a conveyor system has shortcomings. As one example, the contact of the cam follower on the guide track structure is noisy and susceptible to damage and wear. Furthermore, the guide track arrangement can be complex and expensive to build. The guide track arrangement usually cannot be changed without stopping the conveyor.

Thus, there is a need for a sorting or article-diverting conveyor system that lacks one or more of these shortcomings.

SUMMARY OF INVENTION

This need and others are satisfied by a conveying system embodying features of the invention. In one version, the conveying system has an outer conveying side atop which articles are conveyed along a carryway in a direction of travel. A transport element is arranged to ride laterally across the outer conveying side of the conveyor in a direction transverse to the direction of travel. A motor, located with the transport element, drives the transport element and rides with it across the outer conveying side of the conveyor.

According to another aspect of the invention, a conveying system comprises a conveyor conveying articles in a direction of travel along a carryway. The conveyor includes a plurality of transport elements arranged to ride along parallel tracks formed in the conveyor transverse to the direction of travel. A motor is located with each transport element to drive and ride with the transport element along one of the tracks.

A conveying system, in another aspect of the invention, comprises a modular conveyor belt constructed of a series of rows of belt modules hingedly linked together. At least some of the rows include a transport element arranged to ride laterally across the row. A motor located with the transport element drives and rides with the transport element across the row.

According to yet another aspect of the invention, a conveyor belt module extends longitudinally from a forward end to a rearward end, transversely from a left edge to a right edge, and in thickness from a top side to a bottom side. The module body is suitable for being interconnected end to end to other module bodies to form a conveyor belt. A top track formed in the module body extends transversely across the top side of the module between the forward and rearward ends. A transport element rides in the top track. A motor located with the transport element drives and rides with the transport element across the top track.

According to still another aspect of the invention, a modular conveyor belt is constructed of a series of rows of hingedly interconnected belt modules that extend in width from a left edge to a right edge and in thickness from a top side to a bottom side. At least some of the rows include a slot in the top side of the row extending along its width. A guide is disposed in the slot. A transport element translates across the width of the row along the slot. A drive mechanism located with the transport element translates with the transport element. The drive mechanism includes a motor and a gear wheel rotated by the motor. The rotating gear wheel engages the guide to translate the transport element along the slot.

In another version of the invention, a conveying system comprises a conveyor conveying articles in a direction of travel along a carryway. The conveyor includes a lateral slot formed in the conveyor in a direction transverse to the direction of travel. A guide resides in the slot. A motor located with the transport element drives a drive element, which engages the guide to drive the transport element along the slot.

In yet another version, a conveying system comprises a conveyor conveying articles in a direction of travel along a carryway. The conveyor includes a plurality of transport elements arranged on the conveyor to ride along parallel lateral tracks transverse to the direction of travel. A motor associated with each of the transport elements drives it along one of the tracks. A local controller associated with each of the transport elements and the associated motor controls the activation of the motor.

According to another aspect of the invention, a conveying system comprises a slat conveyor constructed of a plurality of parallel drag chains driven in a direction of travel. Parallel slats are attached to and span the drag chains. At least some of the slats include a lateral slot formed in a direction transverse to the direction of travel. A motor drives a transport element along the slot. A local controller associated with the motor controls the activation of the motor.

According to another aspect, a conveying system comprises a slat conveyor that includes a plurality of parallel drag chains driven in a direction of travel spanned by slats attached to the chains. At least some of the slats include a lateral slot, a transport element that rides along the slot, and a motor that rides with and drives the transport element along the slot.

According to yet another aspect, a slat conveyor comprises parallel drag chains spanned by slats attached to the chains. At least some of the slats include motorized transport elements that ride along the slat. One of the drag chains is electrically powered to provide electric power to drive the transport element across the slat.

According to still another aspect, a slat conveyor comprises parallel drag chains spanned by slats attached to the chains. An external electric power source has an ungrounded terminal electrically coupled to one of the drag chains.

BRIEF DESCRIPTION OF DRAWINGS

These and other features and aspects of the invention, as well as its advantages, are better understood by referring to the following description, appended claims, and accompanying drawings in which:

FIG. 7 is an exploded view of a portion of another version of conveyor embodying features of the invention, in which a transport element is electrically powered through conveyor drag chains;

DETAILED DESCRIPTION

Figure 1:
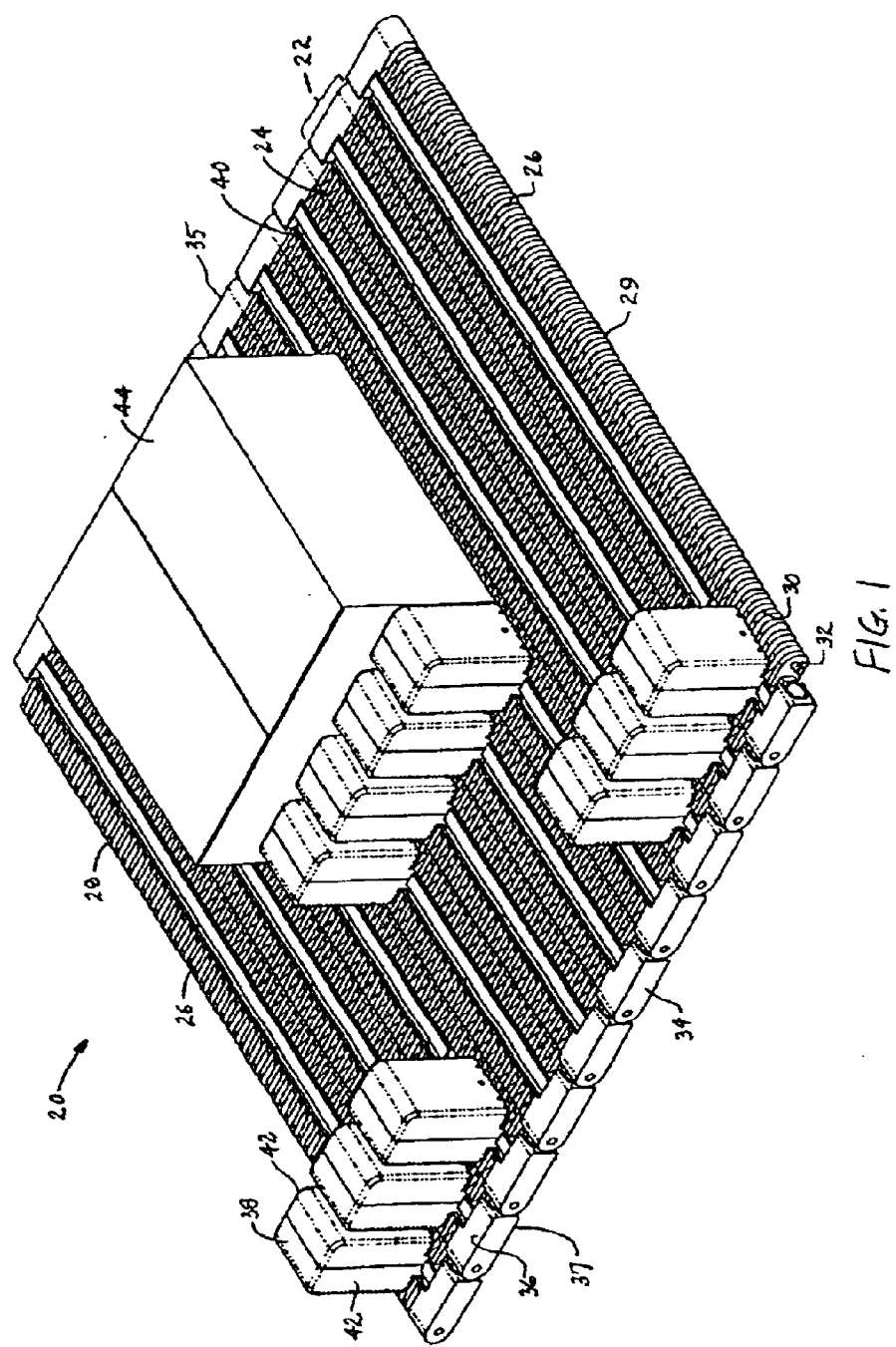
FIG. 1 is an isometric view of a portion of a modular conveyor belt with a motorized transport element usable in a conveying system embodying features of the invention.

FIG. 1 shows a portion of a modular conveyor belt embodying features of the invention. The conveyor belt 20 is constructed of a series of rows 22 of belt modules 24. Hinge elements 26 on the leading 28 and trailing 29 ends of each row are interleaved with the hinge elements on the trailing and leading ends of adjacent rows. Aligned apertures 30 in the hinge elements form a lateral passageway that receives a hinge pin 32 used to pivotally interconnect adjacent rows at a hinge joint. Each row extends laterally from a left edge 34 to a right edge 35 and in thickness from a top side 36 to a bottom side 37. A transport element 38 rides in a track 40 extending laterally across the top side of the belt. The transport element has a pushing surface 42 on each side to push articles 44 across the top side of the belt.

Figure 2:
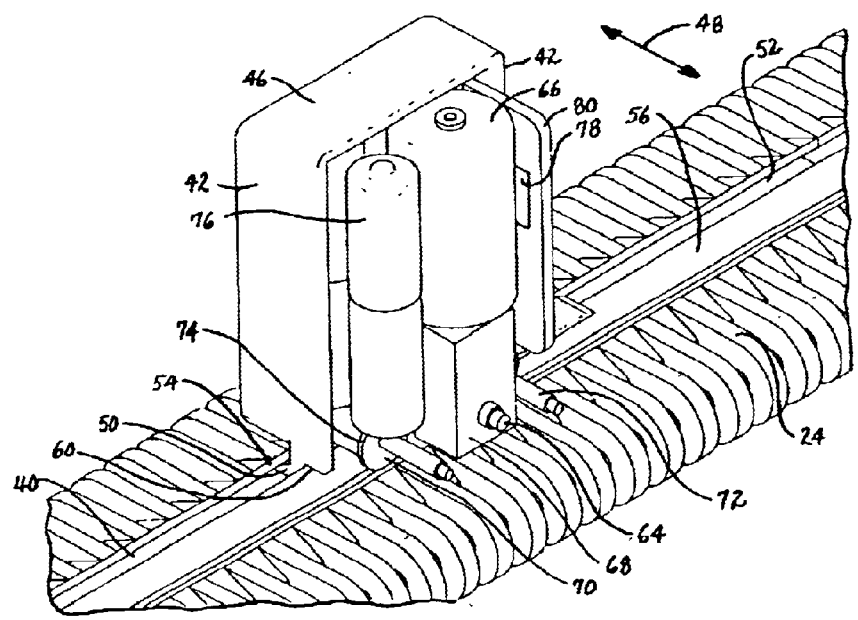
FIG. 2 is a partly cut away expanded isometric view of a portion of one row of the conveyor belt of FIG. 1 showing a transport element at an interior position on the row.
Figure 3:
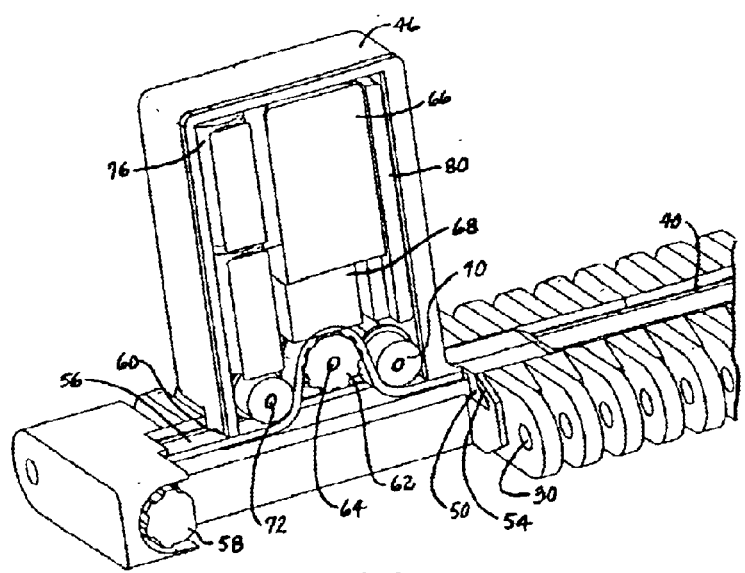
FIG. 3 is a partly cut away expanded view of a belt row as in FIG. 1 showing a transport element near a side edge of the conveyor belt viewed from the direction opposite to that of FIG. 2.

Further details of the transport element are shown in FIGS. 2 and 3. The transport element consists of a housing 46 formed of two halves. Vertical housing walls parallel to the direction of travel 48 form the pushing surfaces 42. Flanges 50 at the bottom of the transport element fit in the track 40, which is formed as a lateral slot 52 in the top side of the module body 24 with overhangs 54 to retain the flanges. A guide, such as a cog belt 56, resides in the track. The cog belt is secured at each end by keepers 58 with teeth that interfit with the cogs and secure the cog belt ends tightly against conveyor belt module edge structure. The cog belt enters and exits the housing through ports 60. The cog belt loops around a cog wheel 62 mounted on a shaft 64 driven by a motor 66 through a gearbox 68. Guide rollers 70 mounted on axles 72 direct the cog belt between the entrance and exit ports and the cog wheel. Shoulders 74 at each end of the guide rollers confine the cog belt in alignment and serve as wheels on which the transport element rides along the track. The shoulders flank the slot and ride across the conveyor belt along a flat portion of the module body along its top side. The motor in this version is driven by a power source consisting of a battery of four storage cells 76. In this version, the motor is a 24V dc motor, such as a conventional drill motor and the battery includes four six-volt cells. Preferably, the batteries are rechargeable. A local controller 78 is mounted on a circuit board 80 inside the housing. The local controller includes electronic circuitry, including, for example, a microcontroller or equivalent digital logic circuits to control the application of battery power to the motor and, thereby, operation of the transport element.

Figure 4:
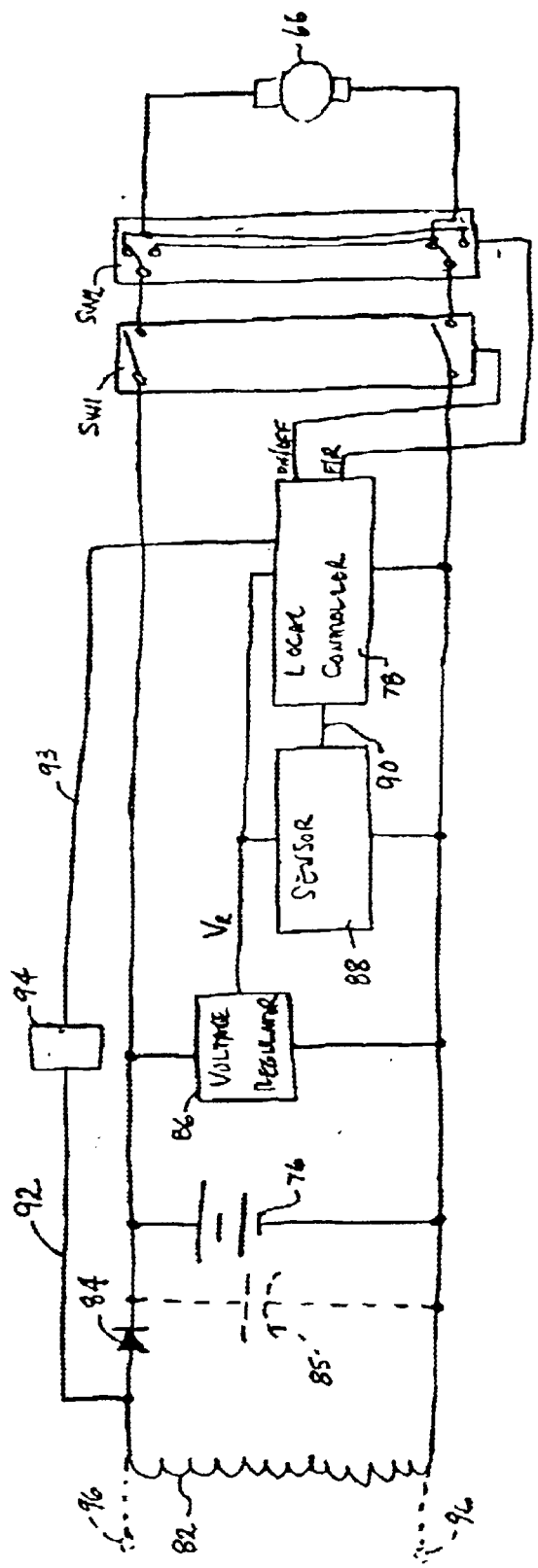
FIG. 4 is a schematic block diagram of electronic circuitry usable in controlling a transport element as in FIG. 1.

One example of electronic circuitry for the transport element is shown in FIG. 4. Electric power is coupled to the transport element from an external source wirelessly via a coil 82, which is the secondary of a transformer in an inductively coupled system or an antenna element in a radio frequency system. The battery 76 can be charged from the coil through a rectifier diode 84. Alternatively, a large capacitance 85 can replace the battery. A voltage regulator 86 produces a regulated dc voltage $V_R$ from the battery voltage. The regulated voltage powers the local controller 78 and an optional sensor 88. The sensor can be used to detect various conditions, such as specific positions along the conveying path and time to start moving the transport element. The sensor could be, for example, an infrared detector or a proximity switch. A sensor signal 90 is sent to the local controller so that it may initiate the appropriate action, such as starting the motor 66. As shown in FIG. 4, the local controller outputs two signals: 1) an ON/OFF signal to a first switch SW1, which connects and disconnects power to the motor; and 2) an F/R (forward/reverse) signal to a second switch SW2, which is a reversing switch that reverses the polarity of the voltage applied to the motor terminals to make the motor run forward or reverse. Message signals, as well as charging power, can be coupled to the local controllers through the coil. A receiver 94 extracts the message signal from the power plus message signal 92 at the coil. The receiver sends the demodulated message signal 93 to the controller to be decoded. The receiver could be replaced by a transceiver capable of transmitting status message signals, as well as receiving command message signals. As another alternative, the coil could be replaced by optional contacts 96 that are ohmically connected to an external power source. In all versions, the battery or the capacitor could serve as the primary source of power, but would preferably be a secondary, or backup, source of power to provide ridethrough during brief outages or momentary interruptions in the external power source.

Figure 5A:
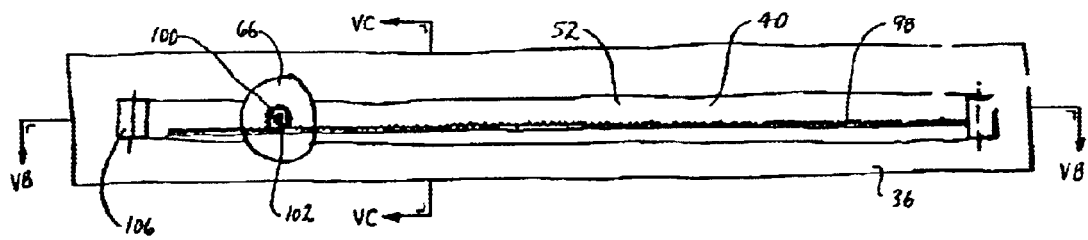
FIG. 5A is a top view of a portion of a conveyor with a motorized transport element usable in a conveying system having features of the invention.
Figure 5B:
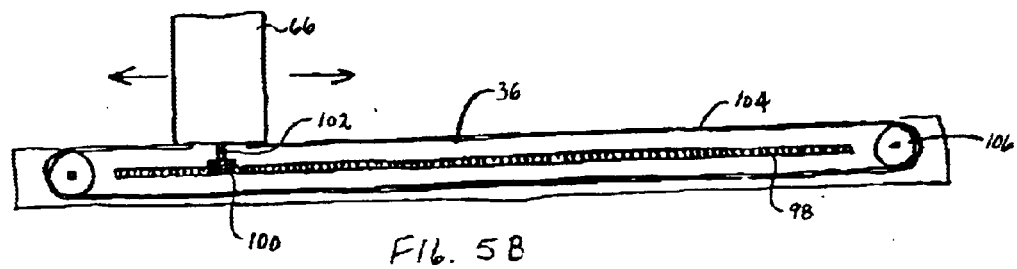
FIG. 5B is a sectional view of the conveyor of FIG. 5A along lines VB—VB.
Figure 5C:
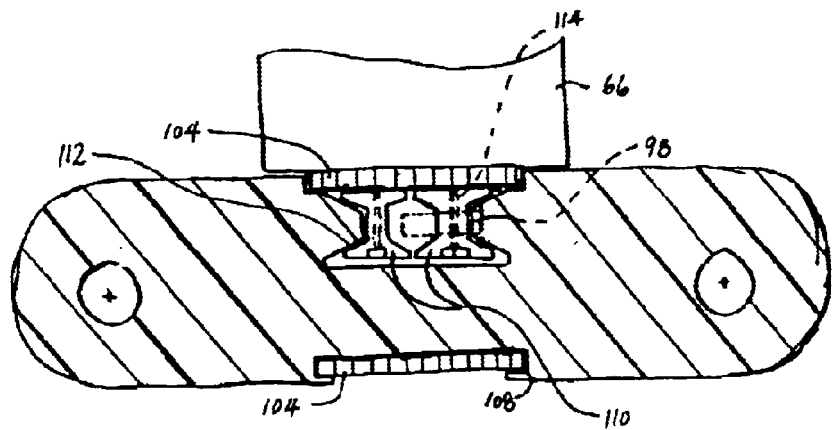
FIG. 5C is an enlarged sectional view of the conveyor of FIG. 5A along lines VC—VC.
Figure 6:
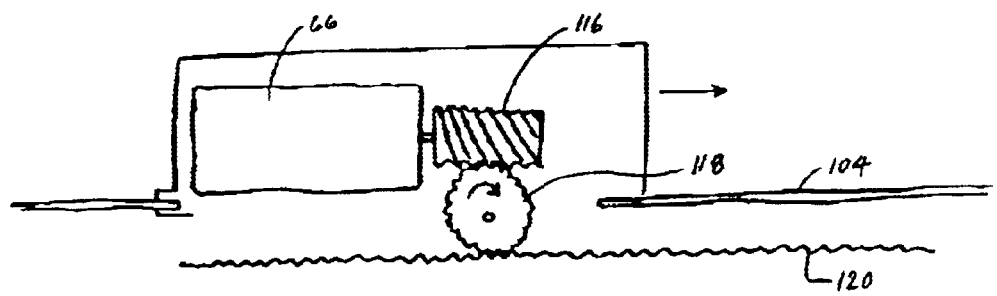
FIG. 6 is a cut away front elevation view of a portion of a conveyor with another version of a motorized transport element embodying features of the invention.

A conveyor other than a modular conveyor belt could alternatively be used, such as slat conveyors or platform-top conveyor belts. FIGS. 5A–C represent one row of a modular belt conveyor, one slat of a slat conveyor, or one platform of a platform-top conveyor belt. In this version, the top track 40 is formed by a lateral slot 52 in the top outer conveying side 36 of the conveyor. A guide, in the form of a rack gear 98, resides along one side of the slot across the width of the conveyor. A motor 66 riding with the transport element has a drive element, such as a pinion gear 100, attached to its shaft 102. As the motor shaft rotates the pinion gear, which meshes with the stationary rack gear, the transport element translates across the conveyor. A cover belt 104 is looped around idler pulleys 106 at each edge of the conveyor and attached at opposite ends to the transport element. A lateral groove 108 in the bottom side 37 of the conveyor accommodates the cover belt. The cover belt covers the slot on the top side of the conveyor to provide a smoother conveying surface and to keep dirt and debris from fouling the track. The transport element has guide rollers 110 extending downward into the slot and shaped to mate with the side walls 112 of the slot. Vertical axles 114 rotatably support the guide rollers. Another version of a transport element usable in a conveyor as in FIG. 5 is illustrated in FIG. 6. In this version, the motor 66 is mounted with its shaft parallel to the top side of the conveyor. A screw gear 116 is affixed to the shaft and rotates with it. The screw gear meshes with a spur gear wheel 118 that rides along a rack gear 120 mounted in the bottom of a lateral slot in the conveyor. As the motor rotates, the rolling gear wheel pulls it and the transport element along the track. A cover belt 104 is attached to the transport element.

Another version of conveyor embodying features of the invention is shown in FIG. 7. The conveyor is constructed of a series of platforms, or slats, 122 mounted on drag chains 124A–D. Alternating chain links have fastening tabs 126 with attachment holes 128. Mounting hardware, such as screws 130, fasten the slats to the chains. In this version, a transport element 132 includes a carrier portion with a platform surface 134 atop which conveyed articles can ride across the slat. The carrier portion is shown extending from one side of the transport element, but could extend from both sides. A drive mechanism (not shown) equivalent to that in FIG. 5 resides in the motor housing portion 135 of the transport element. The transport element rides along a track formed by a slot 136 in the slat. A cover belt 104 is attached to the transport element at each end. The support provided by the interior chains 124B, 124C enhances the beam strength of the slats and prevents them from bowing. For wide conveyors, additional chains can be used.

Figure 9:
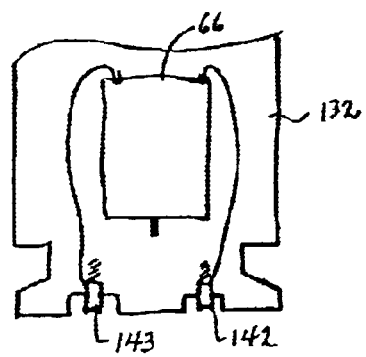
FIG. 9 is a cut away side elevation view of a transport element usable in the conveyor of FIG. 7.
Figure 8:
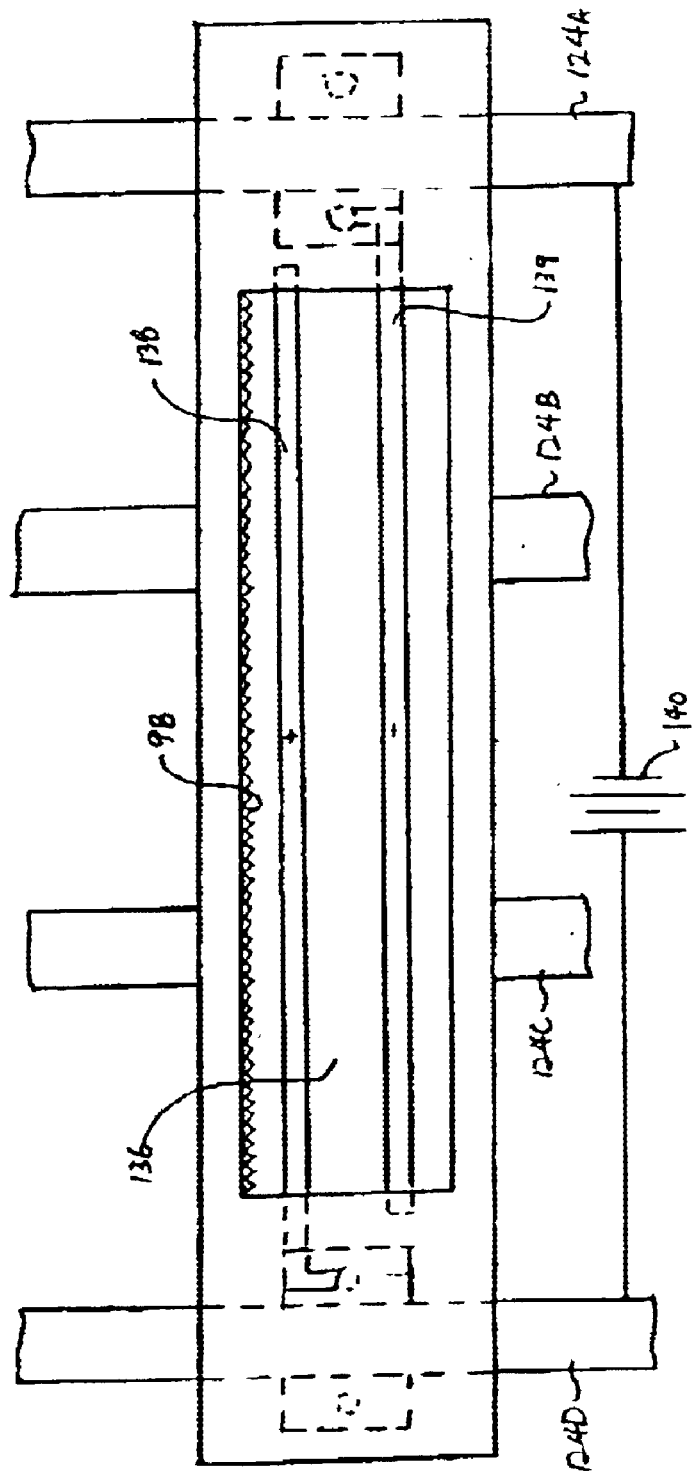
FIG. 8 is an overhead schematic of a conveyor as in FIG. 7.

As illustrated in FIG. 8, the transport element rides along a rack gear 98 in the slot 136. The motor in the transport element is powered through a pair of rails 138, 139 laid out along the slot. One of the rails is electrically connected to one of the chains 124D; the other rail, to another chain 124A. The two powered chains are connected to opposite terminals of a source of electric power 140, such as a dc power supply, which energizes the chains via, for example, drive or idler sprockets. As shown in FIG. 9, the transport element 132 has two electrical brushes 142, 143 that contact the rails to conduct power to the motor 66 and to other electric circuits on board the transport element. Thus, in this version, electric power is supplied ohmically, rather than wirelessly, to the transport element.

Figure 10:
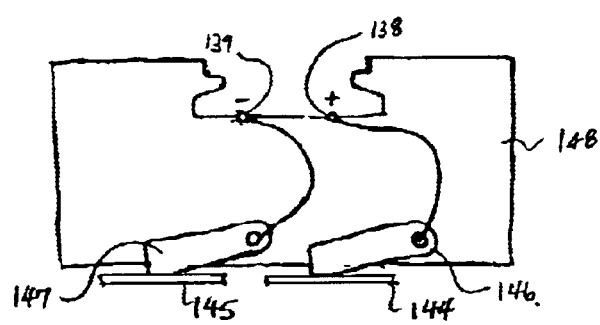
FIG. 10 is a side sectional view of a portion of a conveyor embodying features of the invention, in which the transport element is electrically powered through bus bars underlying the conveyor carryway.

In another version, electric power is applied, not through a drag chain, but through underlying bus bars 144, 145 as shown in FIG. 10. The bus bars are supported along the length of the conveyor carryway. Electrical contacts 146, 147 protrude downward from a slat 148 into contact with the parallel bus bars. The contacts connect power to the rails 138, 139 in the slot 136. The rails can then power a transport element as in FIG. 9.

Figure 11:
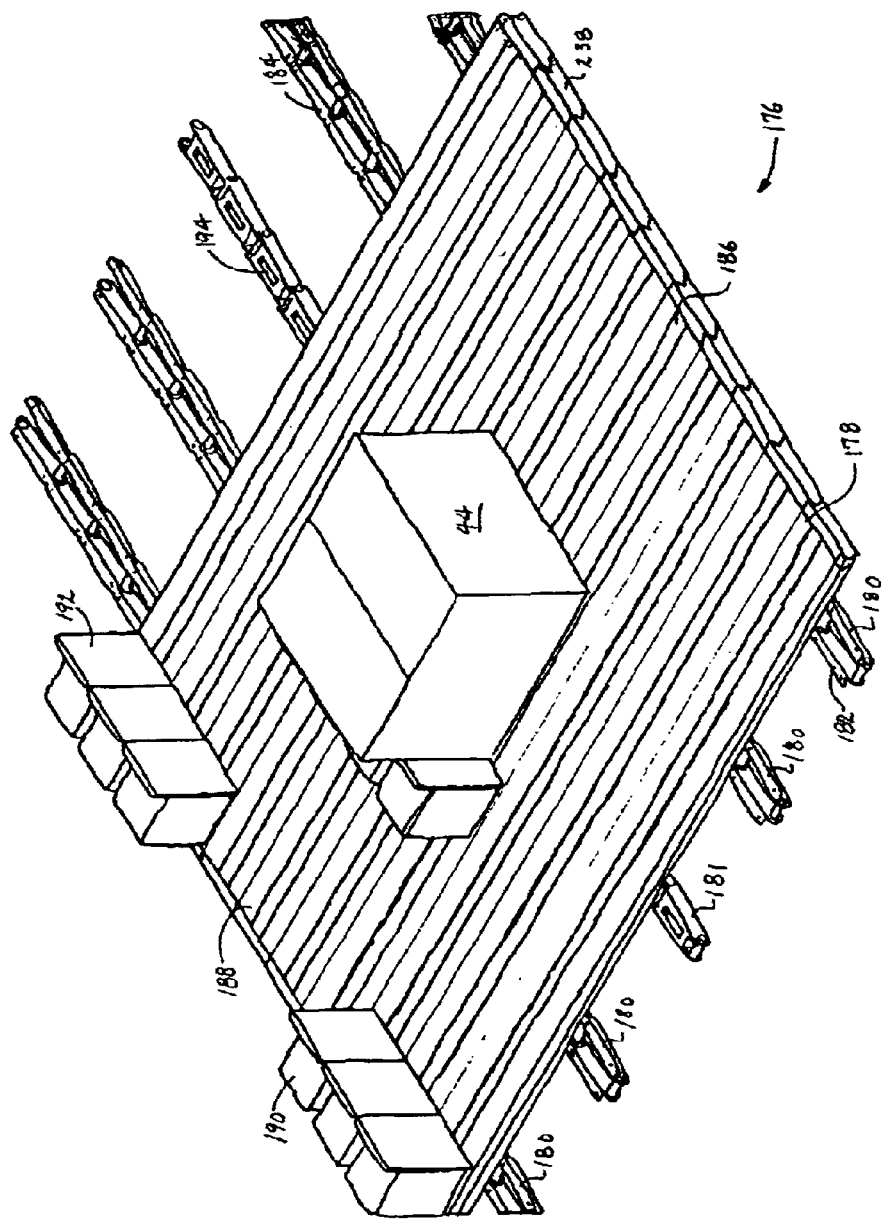
FIG. 11 is an isometric view of a portion of a slat conveyor usable in a conveying system embodying features of the invention.

Another version of conveyor usable in a conveying system as described is shown in FIG. 11. A slat conveyor comprises a series of slats 178 arranged laterally across a group of parallel drag chains 180, 181. The center drag chain 181 in this example differs from the outer drag chains 180, which are conventional with slat-supporting flanges 182 having mounting holes 184 that admit fastening hardware, such as screws or bolts, to fasten the slats to the drag chains. Each slat includes a track 186 along its outer conveying side 188. A transport element 190 with an attached pushing plate 192 is arranged to move laterally across the slat along the track. The pushing plate provides a vertical pushing surface that applies a sideways force to conveyed articles 44 to push them across the conveyor carryway.

The center chain 181 differs from the outer chains 180 in that it includes sockets 194. All the sockets in the chain are electrically connected to each other and bounded by a corrosion-resistant, conductive material, such as copper. As in FIG. 8, an ungrounded terminal of an external electric power source is electrically connected to the center chain through its drive or idler sprocket, which is electrically insulated from the other drag chains and their sprockets. The other drag chains and the other terminal of the electric power source are preferably at ground potential relative to the center chain, which is electrically energized by an external power source. Of course, the energized chain does not have to be in the center position, but could be positioned elsewhere.

Figure 12:
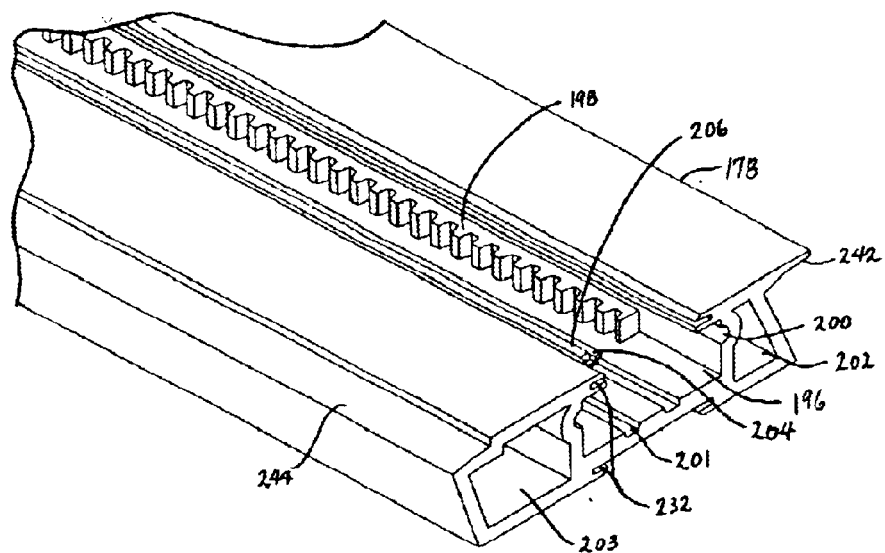
FIG. 12 is an isometric partial view of an end of a slat section of the conveyor of FIG. 11.
Figure 14:
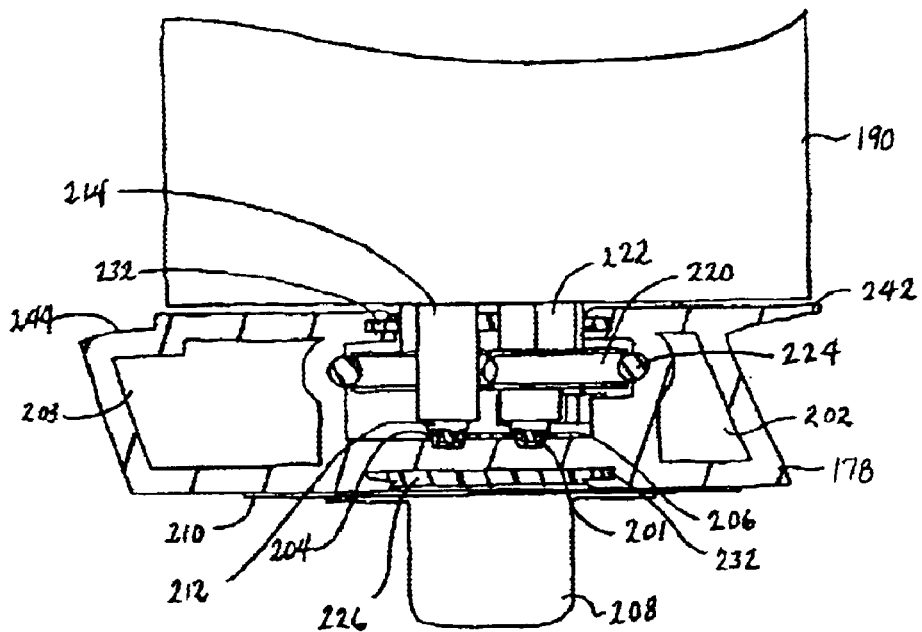
FIG. 14 is a side elevation sectional view of one slat of the conveying system of FIG. 11.

As shown in FIGS. 12 and 14, each slat 178 defines a lateral track in the form of a slot 196. The slat is preferably made of extruded aluminum, but could be made of other materials, such as plastic, and formed other than by extrusion. The slot is generally symmetrical about a central vertical axis of symmetry. Along one side, however, a rack gear 198 is positioned as a track guide for the transport element. Otherwise, each side of the slot has a semicircular groove 200 along a side wall and rectangular grooves 201 along the bottom. Hollows 202, 203 in the slat make it lighter. An insulating seat 204 fits into the two rectangular grooves and is itself grooved to admit conductive rails 206. One of the conductive rails is electrically connected to system ground, which can be the potential of the slat, if metal, or to one of the drag chains 180, which may be grounded. The other conductive rail is electrically connected to the center chain 181 through a prong 208 at the underside of-the slat. The prong plugs into the socket 194 on the center chain and derives power for the transport element from the socket. The conductive prong is isolated from the slat by an insulating pad 210. Brushes 212 extending from insulated bushings 214 ride along the conducting rails and conduct power to the electronics and motor in the transport element.

Figure 15:
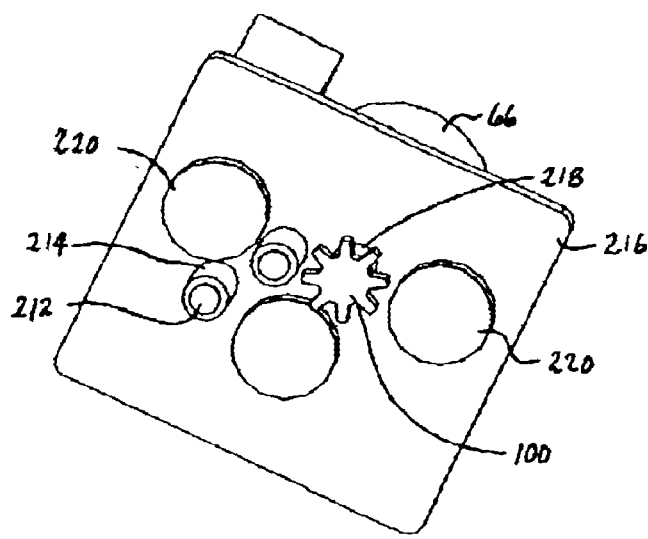
FIG. 15 is a pictorial view of the underside of a transport element of the conveying system of FIG. 11.

As shown in FIGS. 14 and 15, the transport element 190 is supported on a bottom plate 216. A motor 66 drives a spur gear 100 that meshes with the rack gear 198 in the slot. As the motor turns its output shaft 218, the spur gear drives the transport element along the rack gear. Roller wheels 220 freely rotatable about vertical axles 222 snap into place in the slot on circular guide rails 224 that are pressed into the semicircular grooves 200 on the side walls of the slot. The concave peripheral surface of the roller wheels mates with the outer surface of the guide rails, and the rims of the wheels provide the snap-fit.

Figure 13:
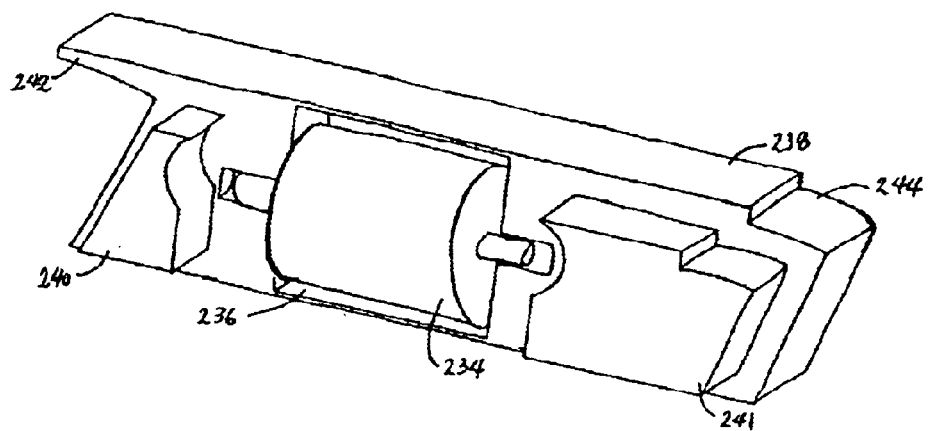
FIG. 13 is a pictorial view of an edge cap for the slat conveyor section of FIG. 12.
Figure 16:
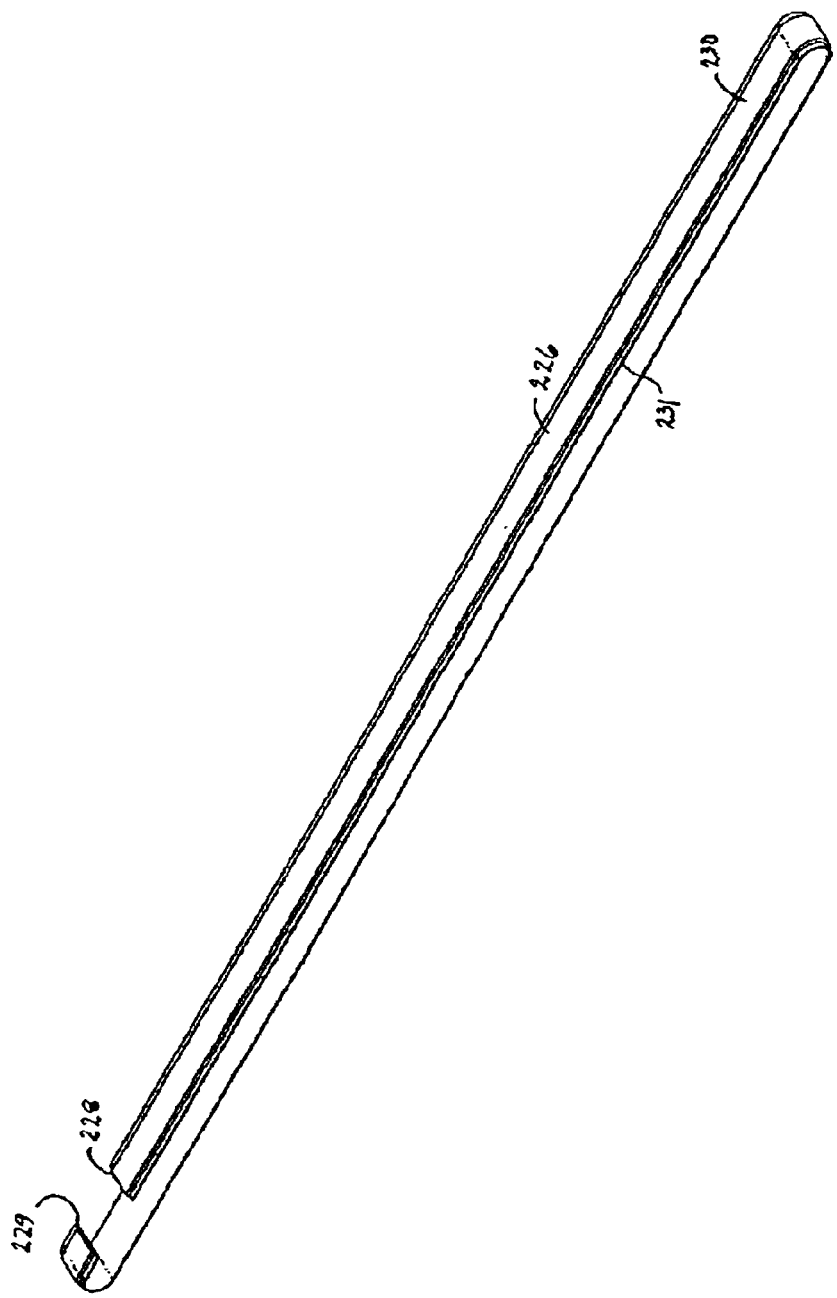
FIG. 16 is an isometric view of a cover belt usable in the slat conveyor of FIG. 12.

To prevent dirt and debris from falling into the slot and fouling the drive mechanism, a cover belt 226 is used. The cover belt, shown in FIGS. 14 and 16, is attached at opposite ends 228, 229 to the transport element. As the transport element translates across the slat, it moves the cover belt with it. The cover belt has an outer raised surface 230 to fit flush with the outer conveying surface of the slat. The raised surface is narrower in width than the base of the cover belt so that a flange 231 is formed along the length of the belt. The flange rides in and is retained in a belt groove 232 formed in the bottom and top sides of the slat. The belt loops around an idler roller 234 retained in a recess 236 formed in edge caps 238 at each side edge of the slat as in FIG. 13. Protruding structure 240, 241 on the edge caps fits snugly into the complementary-shaped hollows 202, 203 on the slats. The rollers allow the cover belt to transition between the top and bottom belt grooves.

The slat and its edge caps include other features, such as an overhang 242 on one end and a complementary recess 244 on the other end to allow the slats to fit together with overlap to avoid vertical gaps between slats.

Figure 17:
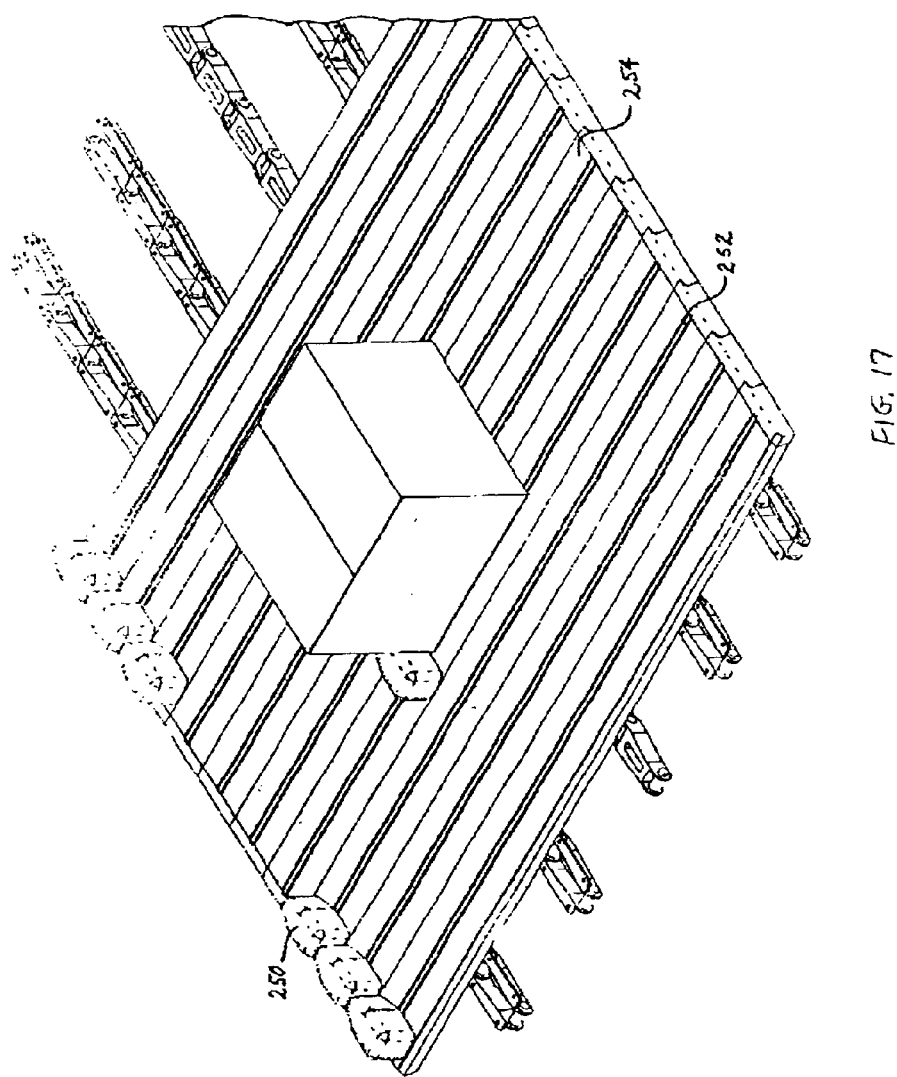
FIG. 17 is an isometric view of a portion of another version of slat conveyor usable in a conveying system embodying features of the invention.
Figure 18:
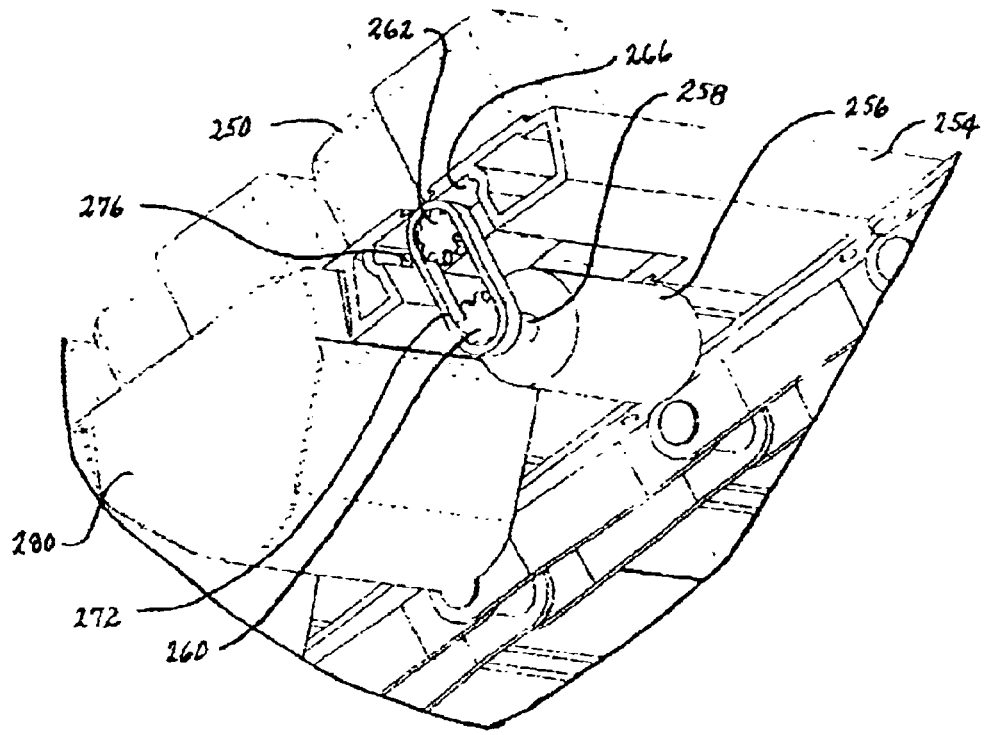
FIG. 18 is a close-up underside view of a portion of the conveyor of FIG. 17 with the motor cover removed.
Figure 19:
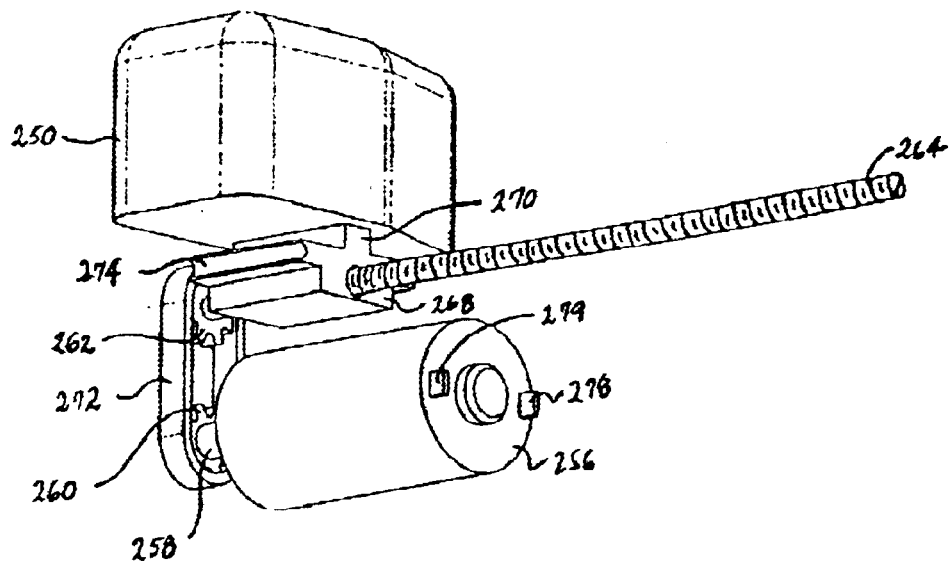
FIG. 19 is a view of the drive mechanism of FIG. 18.

Another version of slat conveyor usable in a conveying system as described is shown in FIG. 17. The slat conveyor is similar to that shown in FIGS. 11–14. Transport elements 250, unlike the transport elements 190 of FIG. 11, do not house drive mechanisms. The transport elements ride along tracks 252 formed across the width of a slat 254. As shown in FIGS. 18 and 19, a motor 256 is affixed to a slat at the slat's bottom side edge. The shaft 258 of the motor terminates in a pinion gear 260. Another pinion gear 262 terminates a lead screw 264 extending across the width of the slat in a slot 266 defining the track. A custom nut 268, attached to the transport element by a neck 270, threadedly engages and rides along the lead screw as it rotates. A drive belt 272, such as a cog belt, is looped around the motor pinion gear 260 and the lead screw gear 262. As the motor rotates its shaft, it drives the lead screw by means of the drive belt to propel the transport element along the track. The nut 268 includes two concave surfaces 274 that receive circular guide rails 276 along each side of the slot. The guide rails retain the transport element in place and provide a bearing surface to guide the transport element along the track. Electric power is applied to the motor across terminals 278, 279 by conductors (not shown) connected to a power source. To protect the motor and the gears, a protective cover 280 encloses the drive mechanism and the side edge of the slat.

Figure 20:
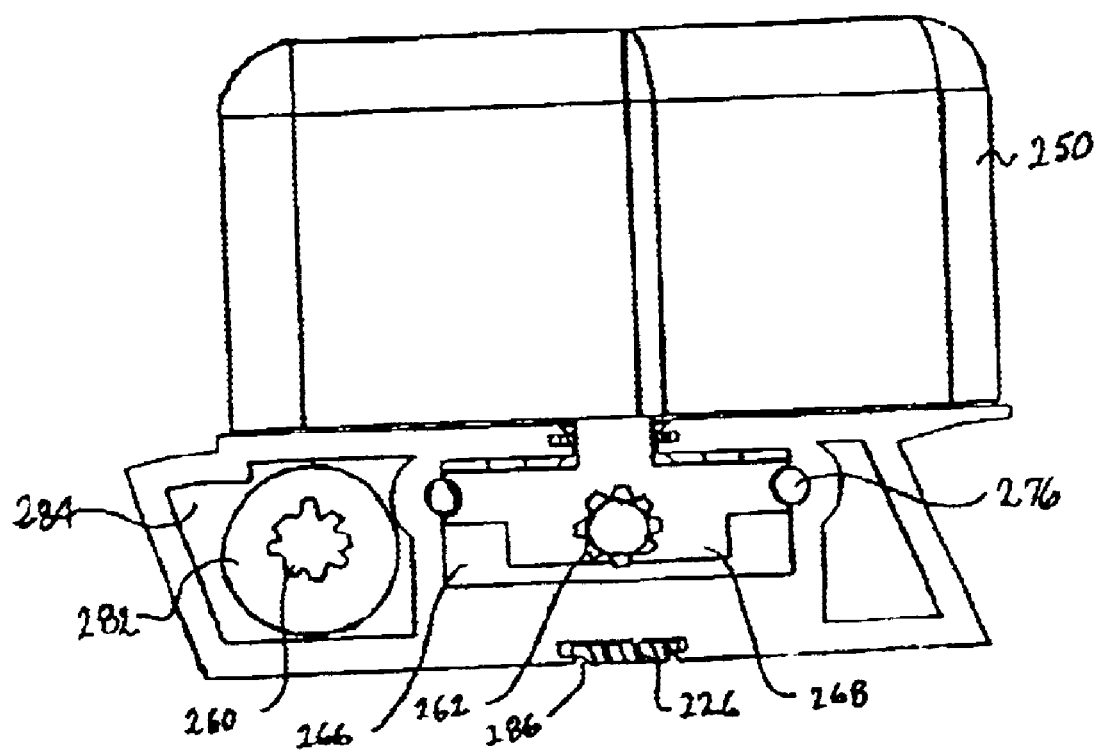
FIG. 20 is a side elevation view of one slat of a slat conveyor as in FIG. 17 in which the drive motor is housed within the slat.

Yet another version of slat is shown in FIG. 20. In this version, a motor 282 is mounted in a cavity 284 formed in the slat. A cog belt (not shown for clarity) loops between the motor gear 260 and the lead screw gear 262 for the motor to drive the lead screw. Associated motor control electronic circuits may also be mounted in the cavity. This version also shows a cover belt 226 attached at opposite ends to the transport element 250 and arranged to ride in a hollow 286 on the bottom side of the slat.

Figure 21:
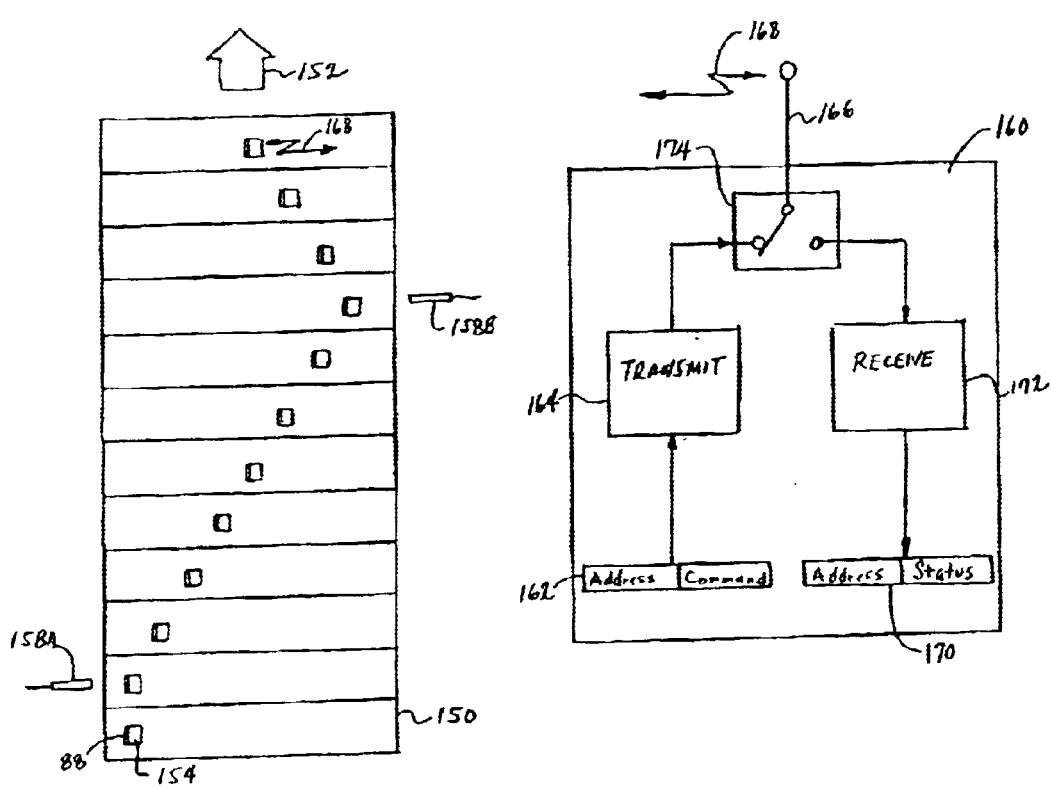
FIG. 21 is a diagram of one version of a conveying system embodying features of the invention.
Figure 5A:
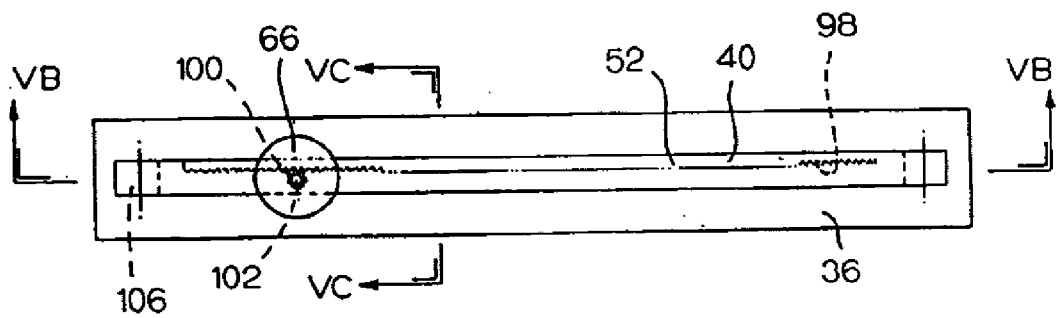
Figure 5B:
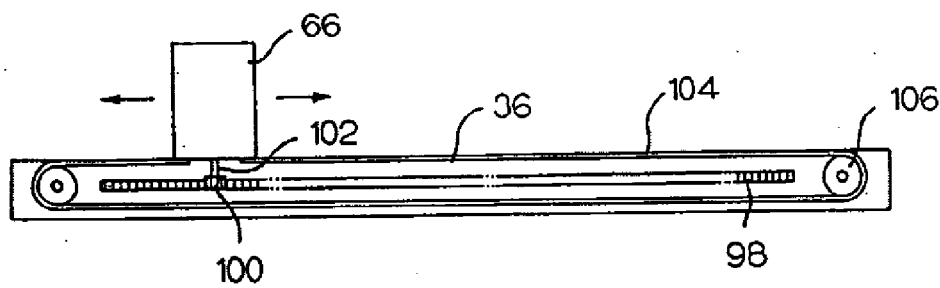
Figure 5C:
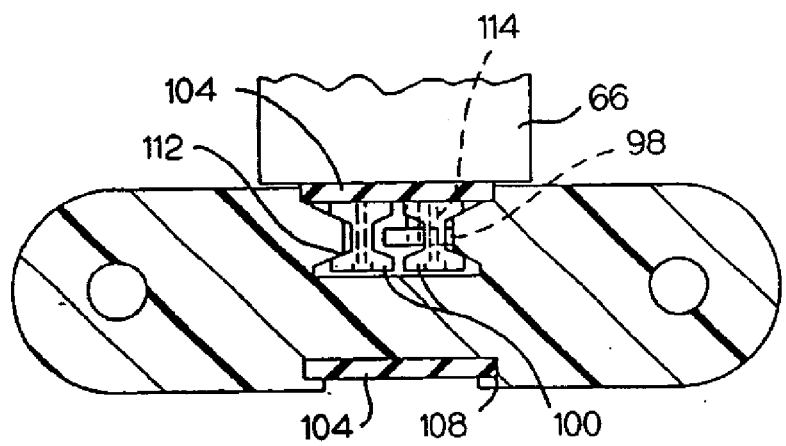

FIG. 21 illustrates one version of a conveying system embodying features of the invention. A conveyor 150 is shown traveling in a direction of travel 152. Transport elements 154 ride laterally along individual slats, platforms, or modular belt rows. The transport elements include sensors 88 that sense the proximity of markers 158A, 158B strategically positioned along the conveyor. The markers may be magnetic, optical, acoustic, electrical, mechanical, or infrared, for example. As shown in FIG. 21, the sensors sense the presence of the upstream marker 158A. Upon sensing that marker, the sensor sends a sensor signal causing the motor to be energized to move the transport element toward the right edge of the conveyor. When the presence of the downstream marker 158B is sensed by the sensor, the transport element moves back toward the left. In this way, the action of the transport elements can be controlled through the programming of their electronic circuitry, which may include intelligent local controllers, and through the positioning or selected activation of the markers along the conveying path.

The transport elements could alternatively or additionally be controlled by a system controller 160. The system controller, which may include a personal computer or a programmable logic controller, could broadcast command message signals 162 through a transmitter 164 and an antenna 166 over a wireless link 168 to the transport elements. By including an address field in the command message and assigning each transport element a unique address, the system controller can control the transport elements individually or in groups. It is also possible to position the antenna close enough to the conveyor to enable it to receive signals from the individual transport elements. For example, the transport elements could transmit status message signals 170 to be picked up by the antenna and received and decoded by a receiver 172 in the system controller. A transmit/receive switch 174 switches the antenna between the transmitter and the receiver. The status could include information relating to battery condition, motor run time, and transport element position. An address field in the status message identifies the responding transport element. The status information is useful in diagnosing and anticipating conveyor problems and in scheduling maintenance effectively. The system controller can also be used to control the activation of the markers along the conveying path.

Although the invention has been described in detail with reference to a few preferred versions, other versions are possible. For example, FIG. 21 shows a conveying system with a wireless communications link. But a direct, ohmically connected link could be used as well to transmit messages. It is further possible to mix and match various features described in some versions with those shown in other versions. For example, the cog belt and cog wheel shown with the modular conveyor belt could be used in the slat chain conveyor, and the rack and pinion drive of the slat chain could be used in the modular conveyor belt. Many methods of coupling power to and establishing a communications link with the transport elements can be used equivalently in various versions of the invention. So, as these few examples suggest, the scope of the invention is not meant to be limited to the specific versions described in detail.

What is claimed is:

1. A conveying system comprising:

a conveyor having an outer conveying side atop which articles are conveyed along a carryway in a direction of travel, the conveyor including:

a transport element arranged to ride laterally across the outer conveying side of the conveyor transverse to the direction of travel; and a motor located with the transport element for driving and riding with the transport element across the outer conveying side of the conveyor.

2. A conveying system as in claim 1 wherein the transport element includes a housing covering the motor.

3. A conveying system as in claim 1 wherein the conveyor further includes a power source electrically coupled to the motor to power the motor.

4. A conveying system as in claim 3 wherein the power source is located with the motor and the transport element to ride with the motor and the transport element across the outer conveying side of the conveyor.

5. A conveying system as in claim 3 wherein the power source comprises a storage cell.

6. A conveying system as in claim 3 wherein the power source comprises a capacitor.

7. A conveying system as in claim 3 wherein the power source is rechargeable.

8. A conveying system as in claim 1 wherein the conveyor further includes a local controller located with the motor to control the motor.

9. A conveying system as in claim 8 wherein the local controller includes a switch for turning the motor on and off.

10. A conveying system as in claim 8 further comprising a marker disposed along the carryway and wherein the local controller includes a sensor responsive to the marker and sending to the local controller a sensor signal indicative of the proximity of the marker to the sensor.

11. A conveying system as in claim 8 further comprising a system controller capable of sending command signals to the local controller and wherein the local controller forms a communications link with the system controller for receiving command signals from the system controller.

12. A conveying system as in claim 11 wherein the communications link is a wireless link.

13. A conveying system as in claim 11 wherein the local controller is assigned an address and is responsive only to command signals that include the assigned address.

14. A conveying system as in claim 1 wherein the conveyor further includes a lateral track along which the transport element rides.

15. A conveying system as in claim 14 wherein the track includes a rack gear and wherein the conveyor includes a pinion gear coupled to the motor and that meshes with the rack gear to advance the transport element across the top conveying side of the conveyor.

16. A conveying system as in claim 14 wherein the track includes a cog belt and wherein the conveyor includes a cog wheel coupled to the motor and that engages the cog belt to advance transport element across the top conveying side of the conveyor.

17. A conveying system as in claim 1 wherein the transport element includes a pushing surface for pushing against conveyed articles.

18. A conveying system as in claim 1 wherein the transport element includes a platform surface for carrying conveyed articles.

19. A conveying system comprising:
a conveyor conveying articles in a direction of travel along a carryway, the conveyor including:
a plurality of transport elements arranged on the conveyor to ride along parallel lateral tracks transverse to the direction of travel; and
a motor located with each of the transport elements to drive and ride with the transport element along one of the tracks.

20. A conveying system as in claim 19 further comprising:
a local controller associated with each of the transport elements and with the associated motor to control the activation of the motor.

21. A conveying system as in claim 20 further comprising a sensor electrically connected to an associated local controller to provide a sensor signal indicative of a position along the carryway.

22. A conveying system as in claim 20 further comprising:
a system controller external to the conveyor; and
a communications link between the system controller and the local controller.

23. A conveying system as in claim 20 wherein each of the transport elements has a uniquely associated motor.

24. A conveying system as in claim 20 wherein the local controller is located with its associated transport element to ride with the transport element along one of the tracks.

25. A conveying system as in claim 20 wherein the local controller is disposed at a fixed position in the conveyor.

26. A conveying system comprising:
a modular conveyor belt including a series of rows of belt modules hingedly linked together, at least some of the rows of belt modules including:
a transport element arranged to ride laterally across the row; and
a motor located with the transport element to drive and ride with the transport element across the row.

27. A conveyor belt module, comprising:
a module body extending longitudinally from a forward end to a rearward end, transversely from a left edge to a right edge, and in thickness from a top side to a bottom side and suitable for being interconnected end to end to other module bodies to form a conveyor belt, the module body including a top track extending transversely across the top side of the module between the forward and rearward ends;
a transport element arranged to ride in the top track; and
a motor located with the transport element to drive and ride with the transport element along the top track.

28. A modular conveyor belt, comprising:
a series of rows of hingedly interconnected belt modules extending in width from a left edge to a right edge and in thickness from a top side to a bottom side, wherein at least some of the rows include:
a slot in the top side of the row and extending along the width of the row;
a guide disposed in the slot;
a transport element arranged to translate across the width of the row along the slot; and
a drive mechanism located with the transport element to translate with the transport element, the drive mechanism including:
a motor; and
a gear wheel rotated by the motor and engaging the guide to translate the transport element along the slot.

29. A conveying system comprising:
a conveyor conveying articles in a direction of travel along a carryway, the conveyor including:
a lateral slot formed in the conveyor in a direction transverse to the direction of travel;
a guide residing in the slot;
a transport element arranged to ride along the slot;
a motor located to ride with the transport element; and
a drive element driven by the motor and engaging the guide to drive the transport element along the slot.

30. A conveying system comprising:
a slat conveyor conveying articles in a direction of travel along a carryway, the slat conveyor including:
a plurality of parallel drag chains driven in the direction of travel;
a plurality of parallel slats attached to and spanning the drag chains, at least some of the slats including:
a lateral slot formed in the slat in a direction transverse to the direction of travel;
a transport element arranged to ride along the slot;
a motor arranged with the transport element to ride with and drive the transport element along the slot.

31. A conveying system as in claim 30 further comprising:
a local controller associated with the motor to control the activation of the motor.

32. A conveying system as in claim 31 further comprising:
an electric power source external to the slat conveyor and including an ungrounded terminal; and
wherein the plurality of drag chains includes a powered drag chain electrically connected to the ungrounded terminal of the electric power source to power the motor.

33. A conveying system as in claim 32 wherein the powered drag chain includes sockets along its length and wherein at least some of the slats include a prong that plugs into the sockets to provide the motor with electric power from the powered drag chain.

34. A conveying system as in claim 31 further comprising a powered rail disposed in the slot.

35. A conveying system as in claim 31 further comprising a powered conducting rail disposed in the slot and a brush extending from the transport element to contact the powered conducting rail to provide electric power to the motor.

36. A conveying system as in claim 30 further comprising:
an electric power source external to the slat conveyor and including an ungrounded terminal; and
wherein the plurality of drag chains includes a powered drag chain electrically connected to the ungrounded terminal of the electric power source to power the motor.

37. A conveying system as in claim 36 wherein the powered drag chain includes sockets along its length and wherein at least some of the slats include a prong that plugs into the sockets to provide the motor with electric power from the powered drag chain.

38. A conveying system as in claim 36 wherein the plurality of drag chains includes a grounded drag chain and wherein the electric power source includes a grounded terminal.

39. A conveying system as in claim 36 further comprising a powered conducting rail disposed in the slot and a brush extending from the transport element to contact the powered conducting rail to provide electric power to the motor.

40. A conveying system as in claim 30 further comprising a pair of guide rails formed along the slot and roller wheels extending from the transport element to roll along the guide rails as the transport element rides along the slot.

41. A conveying system as in claim 30 further comprising a rack gear arranged along the slot.

42. A conveying system as in claim 30 further comprising a cover belt attached at opposite ends to the transport element to cover the slot.

43. A conveying system as in claim 42 further comprising belt grooves formed laterally along top and bottom sides of the slat and idler rollers at opposite ends of the slot about which the cover belt is looped to direct the cover belt between the belt grooves.

44. A slat conveyor conveying articles in a direction of travel along a carryway, the slat conveyor comprising:
a plurality of parallel drag chains driven in the direction of travel;
a plurality of parallel slats attached to and spanning the drag chains, at least some of the slats including:
a motorized transport element arranged to ride along the slat;
wherein one of the drag chains is an electrically powered drag chain to provide electric power to drive the transport element along the slot.

45. A slat conveyor as in claim 44 wherein the electrically powered drag chain includes sockets and wherein the slat includes a prong that plugs into the sockets to make an electrical connection between the electrically powered drag chain and the slat.

46. A slat conveyor conveying articles in a direction of travel along a carryway, the slat conveyor comprising:
a plurality of parallel drag chains driven in the direction of travel;
a plurality of parallel slats attached to and spanning the drag chains; and
an external electric power source having an ungrounded terminal electrically connected to one of the drag chains.

47. A slat conveyor as in claim 46 wherein the external power source includes a grounded terminal and wherein the slats are grounded.

48. A slat conveyor as in claim 46 wherein the external power source includes a grounded terminal and wherein another of the drag chains is grounded.

49. A slat conveyor as in claim 46 further comprising a motor stationarily mounted in a cavity formed in one of the slats.

50. A slat conveyor as in claim 46 wherein the slats include a track, a transport element, and a motor arranged to ride along the track with the transport element.

* * * * *

UNITED STATES PATENT AND TRADEMARK OFFICE
CERTIFICATE OF CORRECTION

PATENT NO.   : 6,802,412 B2
DATED        : October 12, 2004
INVENTOR(S)  : Robert S. Lapeyre and Christoper G. Greve It is certified that error appears in the above-identified patent and that said Letters Patent is hereby corrected as shown below:

Delete drawing sheet 4 consiting of Figures 5A, 5B and 5C, and replace with drawing sheet 4 consisting of Figures 5A, 5B and 5C. (Attached)

Signed and Sealed this

Fifteenth Day of March, 2005

JON W. DUDAS
*Director of the United States Patent and Trademark Office*